United States Patent [19]

Griebling

[11] Patent Number: 5,004,635
[45] Date of Patent: Apr. 2, 1991

[54] CONTOURED LINER FOR PREASSEMBLED TIRE COMPONENTS

[75] Inventor: Stephen T. Griebling, Akron, Ohio

[73] Assignee: Bridgestone/Firestone, Inc., Akron, Ohio

[21] Appl. No.: 239,907

[22] Filed: Sep. 2, 1988

[51] Int. Cl.⁵ .......................................... B65D 85/671
[52] U.S. Cl. .................................... 428/33; 206/412;
428/40; 428/71; 428/74; 428/239; 428/253;
428/906
[58] Field of Search ................. 428/40, 906, 33, 71,
428/74, 253, 239, 236; 206/412; 156/289

[56] References Cited

U.S. PATENT DOCUMENTS

| | | | |
|---|---|---|---|
| 1,356,234 | 10/1920 | Streijffert | 156/289 |
| 1,543,283 | 6/1925 | Falor et al. | 206/412 |
| 1,611,400 | 12/1926 | Andrews | 206/412 |
| 2,639,249 | 5/1953 | Gruin et al. | 206/412 |
| 4,069,359 | 1/1978 | DeMarse | 428/906 |
| 4,862,539 | 9/1989 | Bokich | 428/71 |

FOREIGN PATENT DOCUMENTS 651428 4/1951 United Kingdom .

*Primary Examiner*—George F. Lesmes
*Assistant Examiner*—J. Davis
*Attorney, Agent, or Firm*—Ernst H. Ruf

[57] ABSTRACT

A contoured liner for rolling of a preassembled uncured rubber tire component with a variable cross-sectional thickness into a coil with minimal dimensional distortion. A filler of compressible material such as polyester, is sandwiched between a flexible base and a flexible cover so as to cover only a portion of the base to provide a contour thereto generally inverse to the contour of the tire component. The base is woven polypropylene and the cover is knitted polyester tricot. The cover is preferably secured to the base by a diamond pattern stitching to form a single unit liner. The liner and rubber tire component, when in overlying relationship, provide a generally symmetrical thickness to reduce telescopically, conical coils when assembled into roll form on a supporting reel.

13 Claims, 2 Drawing Sheets

U.S. Patent  Apr. 2, 1991  Sheet 1 of 2  5,004,635
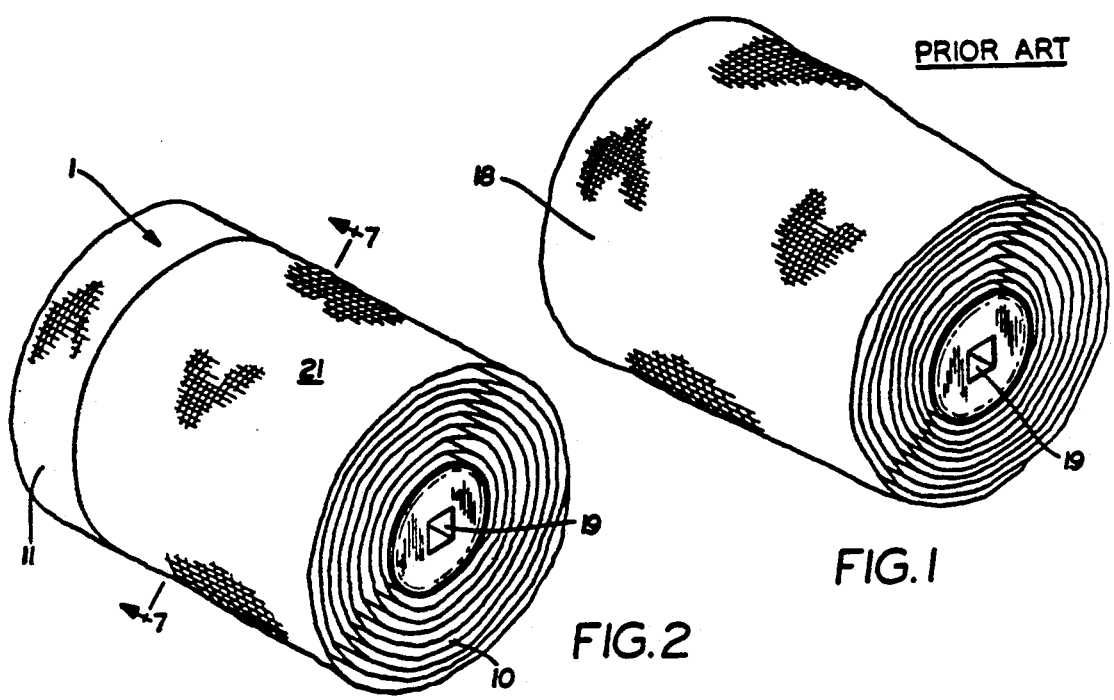
FIG. 1 PRIOR ART
FIG. 2
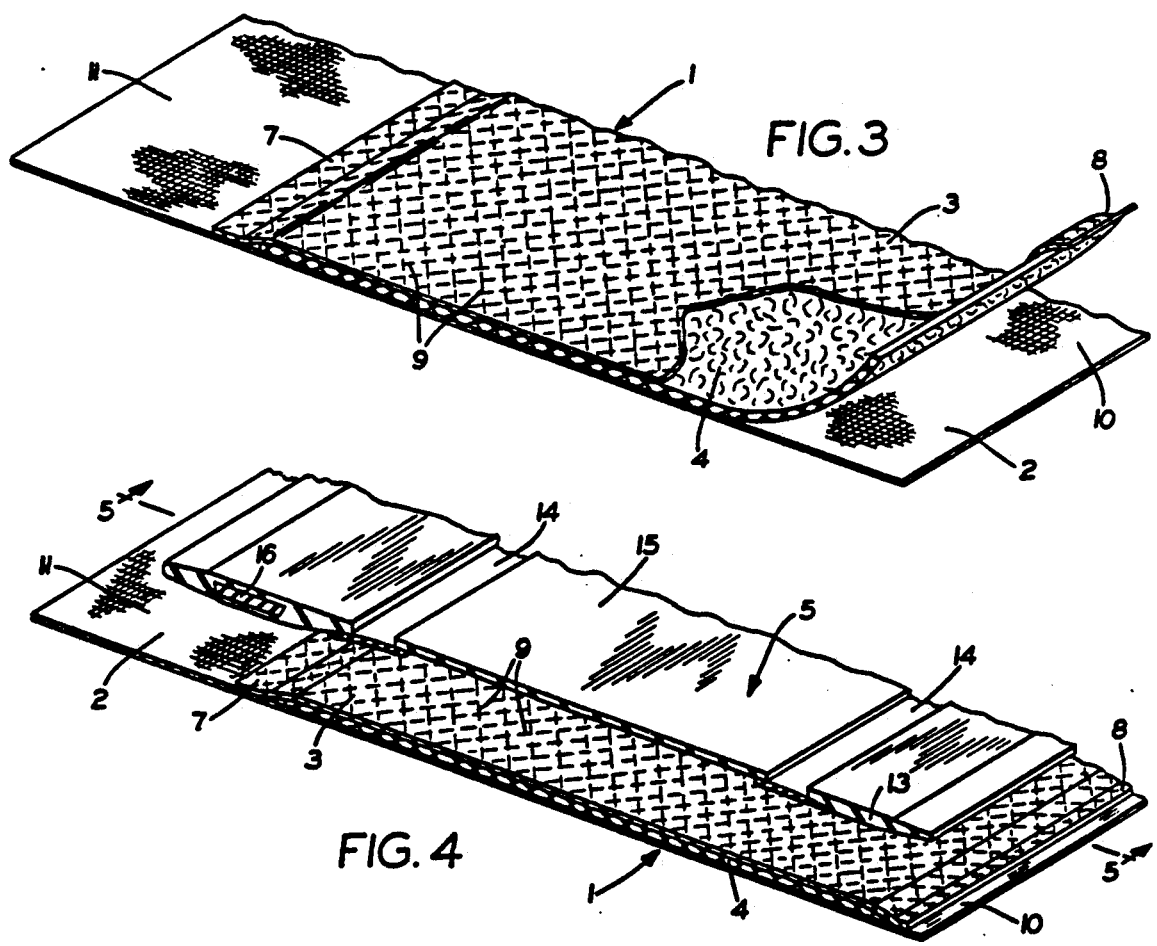
FIG. 3
FIG. 4

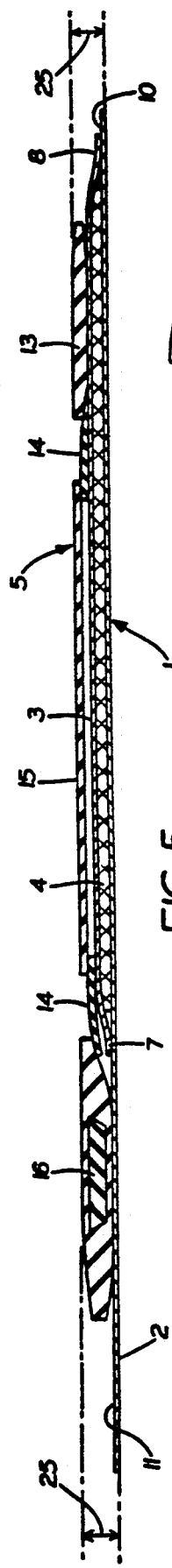
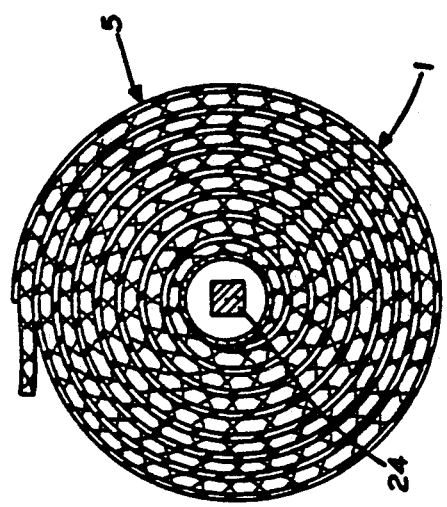
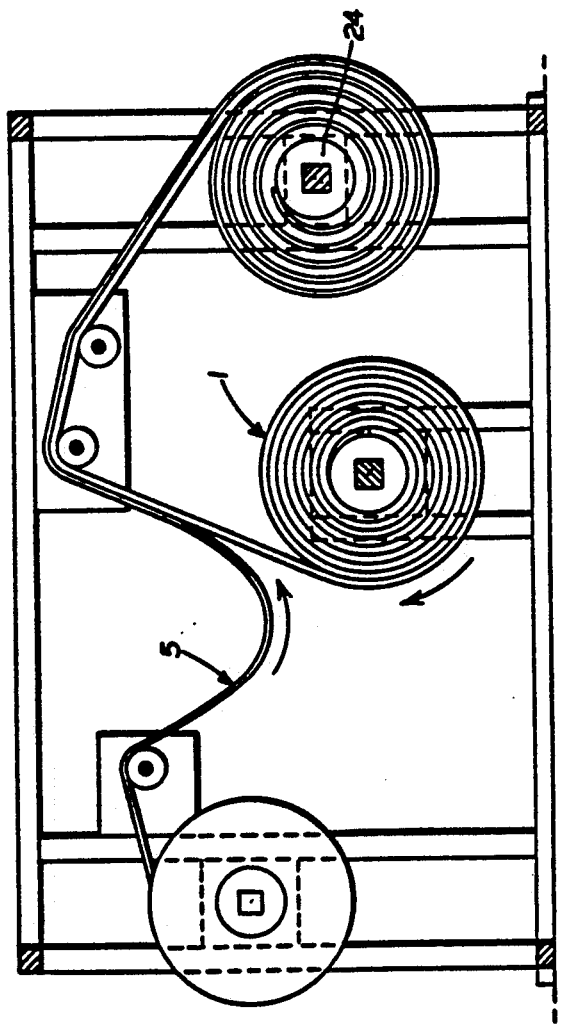
FIG. 5
FIG. 6
FIG. 7

CONTOURED LINER FOR PREASSEMBLED TIRE COMPONENTS

TECHNICAL FIELD

The invention relates to a liner material used in the rolling or coiling of strip materials to permit uniform concentric coiling of the strip material and to prevent distortion of the rolled material into a conical configuration. More particularly, the invention relates to a liner material used in the coiling of preassembled tire components in which the liner has a varying contour and is positioned against the non-uniform thickness of the tire component strip to prevent distortion of the rolled material on a reel or spool for subsequent storage and transportation for use in a tire manufacturing operation.

BACKGROUND ART

In the manufacture of tires, and in particular, pneumatic tires for passenger vehicles, rubber tire components are formed of uncured rubber in elongated strip form for subsequent application to a tire building drum prior to curing in a mold. These preassembled tire components for usual pneumatic tires generally consist of a black sidewall area which is joined by a thin abrasion strip to an intermediate innerliner of a generally uniform thickness which then is joined by another abrasion strip to a white sidewall area. The thickness of the white sidewall area of the preassembled tire component is generally thicker than the black sidewall area, which in turn is thicker than the intervening innerliner and abrasion strip areas. This uneven or contoured strip, when viewed in cross section, is extremely troublesome when packaged on rolls for subsequent storage and shipment for further processing in the tire manufacturing procedure. The unevenness or cross-sectional thickness variation results in telescoping conical rolls when wound into roll form which will wrinkle, crush, or distort the preassembled tire components.

Upon wrapping or rolling of these preassembled tire components, formed of an uncured rubber into roll form, a liner material is used to prevent the adjacent layers of the roll from sticking together. Heretofore, this liner material was of a generally uniform cross-sectional configuration intended only to prevent sticking together of the adjacent layers of the rubber tire material. Although this liner material works satisfactorily in preventing sticking of the rubber strip, it does not assist or eliminate the problem of the telescoping conical shaping of the resulting rolled material.

Therefore, the need exists for a contoured liner for use with strip material of varying cross-sectional thickness, and in particular for a preassembled tire component of varying cross-sectional thickness which will prevent crushing or distortion of the rubber material when in roll form, and which will result in a generally cylindrical roll in contrast to the heretofor conical-shaped roll with the resulting problems inherent therewith upon being placed into roll form.

There is no known prior art liner material of which I am aware which achieves these advantages. The following patents are the closest known prior art.

U.S. Pat. No. 1,356,234 discloses a sheet rubber liner which is interleaved with a rolled rubber sheet. The liner can be formed from parchmentized sheet material and is positioned between flat or coiled rubber material.

U.S. Pat. No. 1,543,283 discloses a non-stick liner which is interleaved with a roll of tacky rubber sheet. The liner comprises a woven fabric with a non-tacky surface.

U.S. Pat. No. 1,611,400 discloses a rolled rubber material having a interleaved liner of fabric coated with cellulose xanthate or viscose to prevent the liner from sticking to the rubber.

U.S. Pat. No. 2,639,249 discloses a liner for rubber sheeting which is comprised of a woven fabric treated with a coating composition, and which has a non-tacky portion which is adhered to the rubber.

British Patent No. 651,428 discloses a protective cellulose sheet which can be interleaved with and stripped from rolled or coiled rubber. Although the cellulose plies have varied thicknesses, such thicknesses applies to varied liner thicknesses for each use, rather than to a single liner having various thickness portions in the transverse cross-sectional direction.

Although all of the patents discussed above disclose interleaved liners for coiling or rolling rubber, none of these patents disclose the use of a liner having a non-uniform thickness or gauge as the contoured liner set forth in detail below.

DISCLOSURE OF THE INVENTION

Objectives of the invention include providing an improved contoured liner for strip material, and in particular, for preassembled tire components having varying cross-sectional transverse configurations in which the raised and recessed areas thereof coincide in an inverse relationship to the raised and recessed areas of the tire components, whereby the tire component and liner when placed in abutting relationship form a generally symmetrical transverse contour thickness whereby the strip and liner, when wound onto a supporting reel or spool for subsequent storage and shipment, form a generally cylindrical roll.

Another objective of the invention is to provide such a contoured liner which consists primarily of a flexible base preferably formed of a woven fabric, and a flexible cover preferably formed of a knitted fabric, with a compressible filler interposed between the base and cover.

A further objective of the invention is to provide such a contoured liner in which the base is formed of polypropylene and the cover formed of a knitted fabric such as polyester tricot, and the filler is formed of a polyester fiber; in which the base material has a greater width in transverse cross-section than the cover; and in which the ends of the cover extend over and beyond the intervening filler which is sandwiched between the cover and base whereby the uncovered area of the liner is adapted to coincide with the thickest portion of the tire component to provide the symmetrical cross-sectional configuration of the combined liner and tire component.

A still further objective of the invention is to provide such a contoured liner in which the knitted cover is secured to the woven base by stitching, preferably in a diamond pattern.

A still further objective of the invention is to provide such an improved contoured liner, which when removed from the tire component, causes minimal dimensional distortion of the tire components through absence of wringling of the knitted cover and permits the contoured liner to be reused in the interest of economy.

These objectives and advantages are obtained by the improved contour liner of the invention adapted for use in rolling a strip of material having a varying thickness into a symmetrical coil, the general nature of which may be stated as including; a flexible base; a flexible cover extending generally coextensive with a portion of the base; and a compressible filler interposed between the base and cover to provide the liner with an irregular transverse contour having raised and depressed areas which generally coincide with the depressed and raised areas, respectively, of the strip to form a generally symmetrical thickness transverse contour when placed in overlying relationship, whereby said strip and liner form a general cylindrical roll when wound onto a supporting reel or core.

BRIEF DESCRIPTION OF THE DRAWINGS

A preferred embodiment of the invention illustrative of the best mode in which applicant has contemplated applying the principles, is set forth in the following description and is shown in the drawings and is particularly and distinctly pointed out and set forth in the appended claims.

FIG. 1 is a generally diagrammatic view of a prior art conical-shaped roll resulting from the rolling of a usual uniform thickness liner with a tire component of varying cross-sectional configuration;

FIG. 2 is a diagrammatic perspective view similar to FIG. 1, showing the resultant cylindrical configuration of the wound roll of preassembled tire components of varying cross-sectional configuration assembled with the contoured liner of the invention;

FIG. 3 is an enlarged fragmentary view with portions broken away and in section, showing the improved contour liner of the invention;

FIG. 4 is a fragmentary view, portions of which are in section, of the contoured liner of FIG. 3, having a portion of a preassembled tire component of varying cross-sectional configuration overlying the liner;

FIG. 5 is an enlarged sectional view taken on line 5—5, FIG. 4, showing the preassembled tire component of varying cross-sectional thickness in overlying relationship with the contoured liner of the invention;

FIG. 6 is a generally diagrammatic view showing the mating of the liner and preassembled tire component and subsequent rolling thereof onto a storage reel; and FIG. 7 is a enlarged sectional view taken on line 7—7, FIG. 2.

Similar numerals refer to similar parts throughout the drawings.

BEST MODE FOR CARRYING OUT THE INVENTION

The improved contour liner of the invention is indicated generally at 1, a portion of which is shown in FIG. 3, and includes a base 2, a cover 3, and an intervening filler 4.

Base 2 has a transverse width as shown in FIG. 5, greater than the transverse width of a preassembled tire component indicated generally at 5, with which contoured liner 1 is adapted for use. Base 2 preferably is formed of a woven fabric of which polypropylene has been found to be the preferred material. Cover 3 preferably is formed of a knitted fabric of which polyester tricot has been found to be the preferred material.

In accordance with one of the main features of the invention, filler 4 is formed of a compressible material with a polyester filling having been found to be a very suitable material. A foam elastomer composition or other similar compressible material would also be satisfactory as well as other types of compressible materials.

Cover 3 is of a narrower transverse width than base 2 as shown in FIGS. 3-5, with the ends 7 and 8 thereof overlapping and extending beyond filler 4. Cover 3 is secured to base 2 by some means of attachment, one particular type found suitable is a stitching of nylon thread indicated at 9, preferably in a diamond-shaped pattern. This provides a sturdy liner construction in which filler 4 is generally fixed between base 2 and cover 3 and is prevented from shifting and moving therein by the stitching pattern.

End 8 of cover 3 as shown in FIG. 4, preferably terminates inwardly of the longitudinal edge of base 2 leaving an uncovered area 10. However, this relationship may vary as well as the amount of an opposite uncovered area 11 of base 2 depending upon the particular transverse cross-sectional configuration of tire component 5. The longitudinal length of base 2, cover 3 and filler 4 of contoured liner 1 will vary, as well as the transverse width thereof depending upon the particular tire building application with which it is intended for use.

One type of preassembled tire component 5 of the type intended for use with liner 1 is shown in FIG. 5, and includes a raised blackwall area 13, a pair of spaced abrasion strip areas 14 and an intervening innerliner area 15. A raised or thickened whitewall area 16 is located on the opposite longitudinal edge of tire component 5 from that of raised blackwall area 13. In most pneumatic tire constructions, whitewall area 16 may have a thickness of approximately twice that of blackwall area 13, which in turn is thicker than intervening innerliner 15 and abrasion areas 14. As seen in FIG. 5, this provides a strip of material having a varying thickness cross-sectional contour which when assembled with a usual heretofore used uniform thickness liner, resulted in a conical-shaped roll 18, as shown in FIG. 1. Such a conical-shaped roll was difficult to maintain and position on a mounting reel or roll 19 and would result in wrinkling of the tacky rubber tire component which could effect the final tire produced thereby.

FIG. 7 shows diagrammatically one type of system in which tire component strip 5 is transferred to contoured liner 1 for subsequent collection on a take-up reel 24, which in accordance with the invention, results in a generally cylindrical configuration as shown in FIGS. 2 and 7.

The accomplishment of this resulting cylindrical roll configuration is best illustrated in FIG. 5. The thickest or white sidewall area 16 of tire component 5 coincides with area 11 of base 2 with innerliner 15 and abrasion areas 14 lying adjacent cover 3 and filler 4. In most applications innerliner 15 and abrasion areas 14 may be spaced slightly above cover 3 and filler material 4. Blackwall area 13 preferably will rest on or abut cover 3 whereby the thickness of filler 4 will provide a generally symmetrical cross-sectional configuration or thickness indicated at numeral 25, to the layered liner and strip component. It is easily seen that without filler 4, the overall cross-sectional thickness of the combined liner and tire component would have a varying or sloping cross-sectional thickness which results in the conical roll configuration as shown in FIG. 1 as in the prior art.

It has been found that the formation of cover 3 of a knitted fabric such as polyester tricot, provides a relatively wrinkle-free material thereby preventing or reducing wrinkling of the tacky tire component 5 when in the rolled configuration. One type of cover material found suitable is polyester having a square yard weight in pounds of approximately 0.296 and a construction of 46.5×45, formed of a 75/24 bright polyester yarn with a gauge in inches of 0.015. This particular material has a warp strength of approximately 565 lbs. and a filling strength of approximately 325 lbs.

It has also been found that the formation of base 2 of a woven fabric provides the most satisfactory results when combined with knitted cover 3 and the compressible filler 4. One type of woven base material found suitable is a polypropylene material having a square yard weight in ounces of approximately 5.15 and a construction of 40×29, in which the yarn warp is formed of a 600 denier multifilament material with the filling yarn being a standard 10 mil mono-filament. The gauge of this base fabric material is approximately 0.02 inches with the warp having a strength of approximately 285 lbs., and the filling having a strength of approximately 175 lbs.

The above description of the particular knitted cover and woven base are believed to be the preferred materials to achieve the best results, but could vary somewhat without effecting the concept of the invention, that is, the cover and base in combination with the compressible filler, the contour of which complements the contour of the tire component to result in the symmetrical thickness in cross-section when combined.

The particular type of compressible filler 4 sandwiched between the cover and base can vary, although, a filler formed of 100 percent polyester fiber with a weight of approximately 2.3 oz. to 2.5 oz. has been found to be most satisfactory. Also, the use of a compressible foam elastomer has been found to be generally as effective. Therefore it is readily seen that other types of compressible filler materials may be used without affecting the concept of the invention.

It also has been found that for most types of applications, with pneumatic tire innerliner materials for passenger vehicles, filler 4 extends approximately two-thirds across the transverse width of base 2. Again, this relationship may vary depending upon the particular tire building application with which contour liner 1 and tire component 5 will be used.

In general, the improved invention includes the use of a contoured liner which is contoured or stepped in thickness in order to offset the generally heavy or thicker whitewall area of a preassembled tire component strip to provide a generally symmetrical thickness combination of a contoured liner and tire component whereby the material forms a generally cylindrical roll when wound on a reel for ease of handling and storage, and prevent or reduce the wrinkling or distortion of the uncured rubber of the tire component material.

Accordingly, the contoured liner of the invention for use with preassembled tire components is simplified, provides an effective, safe, inexpensive, and efficient article which achieves all the enumerated objectives, eliminates difficulties encountered with prior art liners, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved liner for preassembled tire components is constructed and used, the characteristics of the improved liner, and the advantageous, new and useful results obtained; the new and useful structures, devices, elements, arrangements, parts, and combinations, are set forth in the appended claims.

What is claimed is:

1. The combination of a strip of material having a sticky surface of the nature of unvulcanized rubber wherein said strip is irregular in transverse contour having raised and depressed areas, and a separable liner thereon, said liner comprising:
   (a) a flexible base formed of a woven fabric;
   (b) a flexible cover formed of a knitted fabric extending generally coextensive with a portion of the base; and
   (c) a compressible filler interposed between the base and cover to provide the liner with an irregular transverse contour having raised and depressed areas which generally coincide with the depressed and raised areas, respectively, of the strip to form a generally symmetrical thickness transverse contour when placed in overlying relationship whereby said strip and liner form a general symmetrical roll when wound onto a supporting reel.

2. The combination defined in claim 1 in which the base is formed of polypropylene.

3. The combination defined in claim 2 in which the polypropylene woven fabric has a gauge of approximately 0.020 inches with a construction of 40×29 and a yarn wrap of 600 denier multifilament and a filling yarn of 10 mil monofilament.

4. The combination defined in claim 2, in which the woven base has a weight per square yard of approximately 5 oz.

5. The combination defined in claim 1 in which the knitted fabric is polyester tricot.

6. The combination defined in claim 5, in which the polyester tricot preferably is of the type having a square yard weight of approximately 0.3 lbs, and is formed of a polyester yarn having a gauge of approximately 0.015 inches.

7. The combination defined in claim 5 in which the polyester tricot has a construction of 46.5×45 with a 75/24 bright polyester yarn.

8. The combination defined in claim 1 in which the filler is polyester.

9. The combination defined in claim 8 in which the polyester filler has a weight of approximately 2.3 oz. to 2.5 oz.

10. The combination defined in claim 1 in which the cover is secured to the base by stitching.

11. The combination defined in claim 10 in which the cover is stitched to the base in a diamond pattern.

12. The combination defined in claim 1 in which the material strip is a preassembled uncured rubber tire component including in transverse cross section a raised whitewall area and a raised blackwall area with an intervening innerliner area, with said whitewall area having a greater thickness than the blackball area.

13. The combination defined in claim 12 in which the whitewall area aligns with a portion of the base free of the filler; and in which the innerliner and blackwall area align with the filler to provide the generally symmetrical transverse contour to the strip and liner when placed in overlying relationship.

* * * * *